July 7, 1970  T. H. FAIRBANKS  3,518,720
APPARATUS FOR MAKING NET-LIKE STRUCTURES
Filed Jan. 31, 1968  3 Sheets-Sheet 3

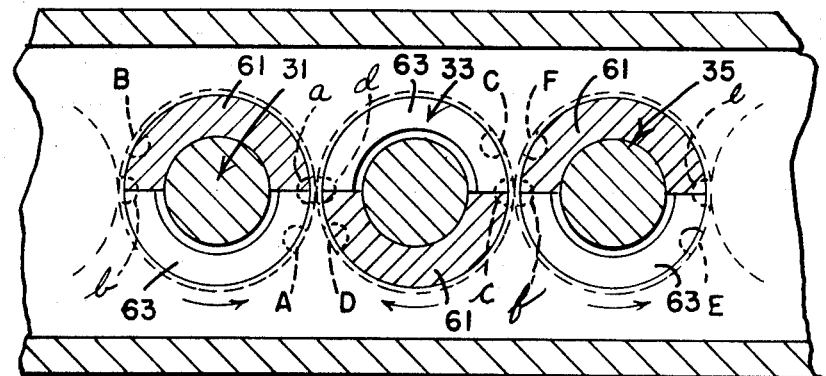
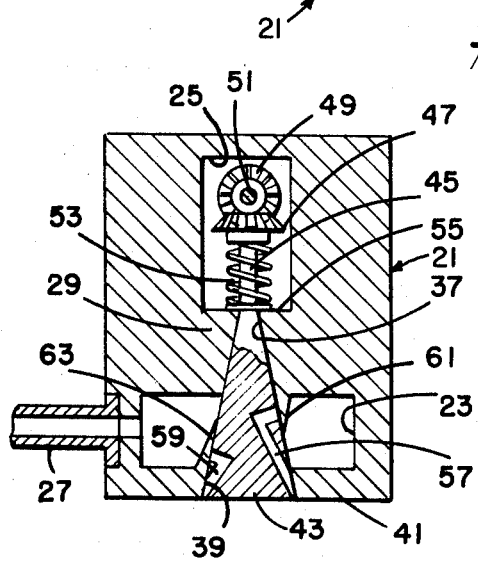
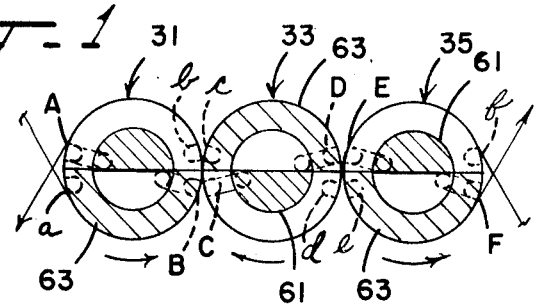
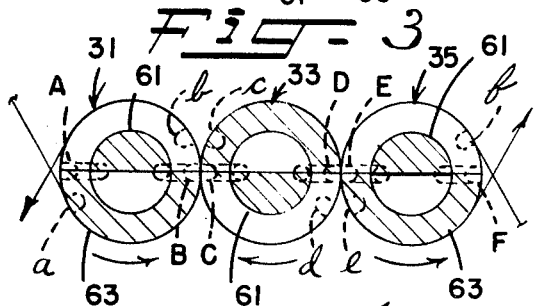
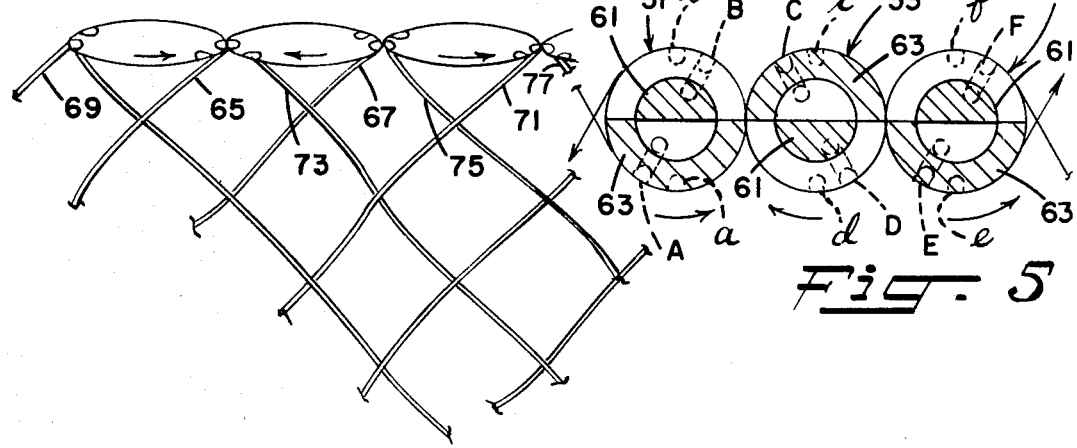

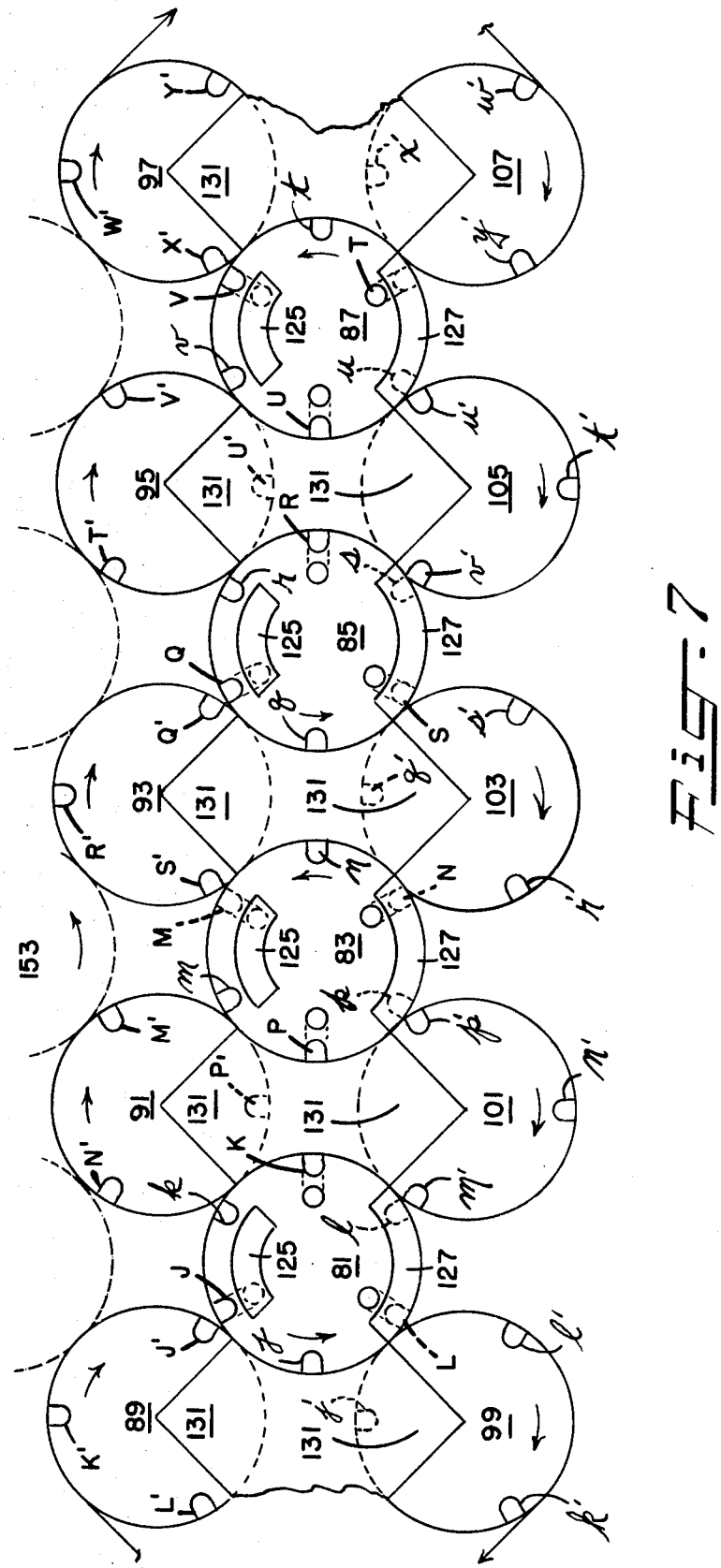

United States Patent Office 3,518,720
Patented July 7, 1970

3,518,720
APPARATUS FOR MAKING NET-LIKE
STRUCTURES
Theodore H. Fairbanks, West Chester, Pa., assignor to
FMC Corporation, Philadelphia, Pa., a corporation of
Delaware
Filed Jan. 31, 1968, Ser. No. 702,048
Int. Cl. D02g 1/20; D01d 3/00
U.S. Cl. 18—8                                    6 Claims

ABSTRACT OF THE DISCLOSURE

Manufacture of net-like structures in which two series of extruded spaced streams are moved in opposite directions along separate serpentine paths which periodically intersect with each other, with the extruded streams being set either before or after they have contacted with each other.

---

The present invention relates to an apparatus for making net-like structures or webs having interlaced strands by direct extrusion.

In U.S. patent application entitled, "Method and Apparatus for Extruding Woven Net-Like Structures," Ser. No. 677,603, filed Oct. 24, 1967, there is disclosed a method and apparatus for making generally flat woven webs or net-like structures by using a pair of rotatable or reciprocating die members. There is, however, a need for light-weight webs having greater bulk and perhaps more covering power than is provided by flat woven webs or net-like structures, for example, in applications where thermal and/or shock insulating is necessary or desirable. Accordingly, a primary object of this invention is to provide a generally new and improved and more satisfactory apparatus for making webs or net-like structures having interlaced strands.

Another object of this invention is the provision of an improved apparatus for making net-like structures or webs having interlaced strands which may be bonded at least at certain of their crossing points.

Still another object of this invention is to provide an apparatus for making, by extrusion, woven webs or net-like structures or braids which are generally bulkier than flat woven webs.

A further object is the provision of an improved extrusion apparatus, which includes no reciprocating elements, for making net-like structures or fabrics having interlaced strands.

A still further object of this invention is to provide an extrusion apparatus which is adapted for continuous rapid and economical manufacture of net-like structures, webs or fabrics having interlaced strands.

These and other objects are accomplished in accordance with the present invention by and apparatus for carrying out a method in which extruded streams of plastic or flowable strand-forming material of one series of such streams are together moved in one general direction transversely of the direction of extrusion, along a serpentine path which periodically crosses or intersects with a separate serpentine path along which are moved, in generally an opposite direction, another series of such streams. The term "serpentine" is employed throughout the description and claims in its ordinary sense as meaning "wavy"; that is, having main crests and valleys, although all waves need not be of smooth or of the same contour. Moreover, while the serpentine paths are out of phase with each other they may be less than 180° out of phase and need not be of the same frequency.

The movement of the series of extruded streams of strand-forming material in generally opposite directions relative to each other provides for a desired crossing of the streams of one series of streams with those of the other of such series of streams. The streams of the two series of streams are located in staggered or off-set relationship so that at least one stream of one series passes through the locations at which their serpentine paths intersect alternately with streams of the other of such series. Thus, as the streams of two series of streams pass in an alternating sequence, as mentioned above, through the locations at which their serpentine paths cross or intersect a desired interlacing of the streams, or the strands which are formed by such streams, is achieved.

The movement of each series of streams along its respective serpentine path is preferably continuous, with the streams of each series moving in unison and with the streams of both series moving at the same rate of speed. Such movement of the streams of each series is perhaps most easily and preferably effected at the points or locations at which such streams are extruded.

The extruded streams of strand-forming material are set into strands in any conventional manner, as by cooling, solvent removal, or chemical conversion, depending upon the particular character of the strand-forming material which is being employed. Setting may be effected before or after crossing streams of strand-forming material have made contact with each other, or may even be varied, depending on whether it is desired to have the interlaced strands in the finished net-like structure free of or bonded to each other.

The apparatus of the present invention for carrying out the above-described method includes a means for extruding a series of streams of plastic material at spaced intervals along each of two intersecting serpentine paths, means for moving the streams of each series along their respective serpentine paths with the streams of one series moving in directions generally opposite to that of the other series thereof, and means for setting the extruded streams of plastic material. More particularly, the apparatus includes a plurality of cooperating spinnerets, means for rotating the spinnerets in desired directions and in timed relationship, and means for controlling the sequence of extrusion of flowable material through the spinneret openings in accordance with a predetermined pattern. The spinnerets are mounted for rotation within openings of a fixed support, with the peripheries of selected adjacent spinnerets being in tangental contact with each other. Passages, for feeding plastic or flowable strand-forming material, extend through the spinnerets and terminate along the peripheries thereof as extrusion openings.

In the operation of this apparatus, the spinnerets are all continuously rotated in selected directions, as hereafter described, at the same rate of speed so that extrusion openings in adjacent contacting spinnerets assume aligned and communicating relationships substantially at their points of tangency. The flow of strand-forming material through the individual spinneret feed passages is controlled during the rotation of the spinnerets so that extrusion occurs through the openings thereof in a desired and predetermined sequence and only during a portion of their respective arcuate movements. This control is preferably achieved by stationary shutters which sequentially close off the individual spinneret feed passages from the supply of flowable strand-forming material during the same portion of their respective arcuate movements.

The flow control shutters of the different spinnerets are oriented relative to each other to achieve a progressive covering of certain spinneret feed passages and a concomitant uncovering of feed passages in contacting spinnerets as the extrusion openings defined by such passages move into and beyond communicating relationships.

More particularly, as extrusion openings of contacting spinnerets move through positions in which they communicate with each other, the spinneret feed passage of only one of such openings is closed off by the shutters. Thus, as such cooperating extrusion openings of contacting spinnerets move into and beyond fully aligned and communicating positions, a spinneret feed passage of one of these extrusion openings is progressively uncovered while, concomitantly, the feed passage for the other of such openings is being progressively covered by a shutter. During this period in which cooperating extrusion openings of contacting spinnerets are in communication with each other, the extrusion of strand-forming material from the one spinneret opening, whose feed passage is being covered by a shutter, is reduced and ultimately stopped. Simultaneously, the extrusion of strand-forming material from the communicating spinneret opening, whose feed passage is being uncovered, is gradually increased until it alone is extruding strand-forming material. Thus, the operation of extruding an individual stream of strand-forming material is in effect, transferred from one spinneret to a contacting spinneret without any disruption in the stream continuity.

In view of the continuous rotation of the spinnerets, a spinneret which had just assumed the extrusion of a stream of strand-forming material carries or moves the same along a portion of its intended serpentine path concomitantly with its continuous extrusion. This extrusion and movement of the stream of strand-forming material is continued until its extrusion is assumed by another adjacent spinneret in a manner as heretofore described.

Simultaneously with this transition in the extrusion of a stream of strand-forming material from one spinneret to another, the spinneret from which extrusion is terminating and the spinneret which is assuming extrusion of such stream are themselves, respectively, assuming and ceasing the extrusion of still another of such streams of strand-forming material. More particularly, a spinneret which is assuming the extrusion of a stream of strand-forming material at one location is, at some other location along its periphery, terminating the extrusion of a similar stream which is being undertaken by a contacting spinneret. Likewise, a spinneret which at one location is terminating the extrusion of a stream of strand-forming material is, at some other location along its periphery, assuming the extrusion of a similar stream from a contacting spinneret.

As described above, the locations at which the extrusion of a stream of strand-forming material is terminated from one spinneret and assumed by another occur are the points at which such spinnerets make tangental contact. Since these points of tangental contact between spinnerets do not vary, the locations at which the transition in the extrusion of the streams of strand-forming material occur are always the same. At each of these locations, however, adjacent spinnerets assume extrusion of a stream of strand-forming material in alternating relationship. That is, the spinneret which has just assumed the extrusion of a stream of strand-forming material from an adjacent spinneret at their location of tangency, next transfers the extrusion of a similar stream to such adjacent spinneret at the same location.

As heretofore mentioned, in the practice of the method with the apparatus of the present invention, the movement of the series of streams of strand-forming material in generally opposite directions along intersecting serpentine paths is effected at the points at which such streams leave the extrusion orifice and it is along these paths that the respective series of streams cross or intersect with each other. The locations at which the streams cross, however, are spaced from the extrusion apparatus itself and thus, there is an adequate opportunity to control the setting thereof into strands. Setting of the extruded streams may be effected by any suitable means before or after they have made contact with each other to maintain the resulting strands free of or bonded to each other. If desired, some of the streams may be set before they contact while others may be set after contact has been made so that both bonded and unbonded strands exist in the finished net-like structure.

A particularly significant aspect of the present invention is that the individual streams of strand-forming material are moved along serpentine paths concomitantly with their extrusion and thus each stream is of wavy or sinuous configuration. The strands which are formed as these streams are set retain this wavy or sinuous configuration and therefore the finished net-like structure or web possess a desired bulked or puffed characteristic.

The size of the mesh openings in the finished net-like structure, and thus its covering power, is dependent upon such factors as the diameter of the spinnerets, the size and number of spinneret extrusion openings, and the speed at which such spinnerets are rotated. The smaller the spinneret diameter, the smaller the mesh openings. Further, by increasing the size of the spinneret extrusion openings, a greater amount of strand-forming material is extruded therethrough and the thicker are the resulting strands. However, the thicker the strands, the more rigid is the resulting net-like structure. On the other hand, increasing the number of spinneret extrusion openings and/or the speed of rotation of the spinneret provides for more frequent crossing of the extruded streams or resulting strands and thus reduces the size of the mesh openings in the finished net-like structure, besides providing for a denser product.

If desired, the spacing between extrusion openings along the periphery of the individual spinnerets may differ and the spinnerets may be together rotated at a nonuniform or perhaps pulsating rate of speed to provide a net-like structure having a varying mesh pattern along different portions thereof. It will be understood, however, that the number, spacing and orientation of the extrusion openings in the spinnerets and the speed of spinneret rotation must be such as to insure that the extrusion openings of contacting spinnerets communicate in a pre-determined sequence as heretofore described. While the extrusion openings may vary in depth; the openings through which the respective series of streams issue should be of the same dimensions as measured along the spinneret peripheries to insure proper transition in the extrusion of a stream of strand-forming material from one spinneret to another.

The bulk of the net-like structure can also be controlled by varying the serpentine paths along which the streams of strand-forming material are moved during extrusion. Thus, in one embodiment of the apparatus of the present invention, a series of spinnerets are disposed in contacting relationship with their axes located in either a single plane to form a flat net-like structure or along a circle or arc to provide a structure of tubular or curved shape. With the spinnerets being aligned in this manner, the streams of strand-forming material which are extruded therefrom follow serpentine paths having smooth and uniform crests and valleys.

In another embodiment of the apparatus, a group of spinnerets is disposed in each of a plurality of parallel planes or concentric circles with the spinnerets in adjacent planes or circles being off-set or staggered and in contact with each other. With this arrangement, streams of strand-forming material issuing from extrusion openings of a spinneret located in one of such planes or circles are transferred to openings in spinnerets located in adjacent planes or circles and will be moved along serpentine paths in which the crests and valleys are more pronounced than those provided by the first described embodiment of the apparatus. By employing groups of spinnerets in a number of such parallel planes or concentric circles, a stream of strand-forming material may sequentially pass through a series of such planes or circles before it reverses its path and thus, the crests and valleys of its serpentine path may themselves be of wavy rather than of smooth contour.

The teachings of the present invention are applicable for use with a variety of materials, which are referred to by the terms "plastic" and "strand-forming materials," including materials which are thermoplastic, such as polyamides, polyesters, polyvinyl chloride, copolymers thereof, polyolefins, cellulose acetates, metals, glasses, etc., natural or synthetic rubbers, thermosetting materials or wet-spinnable materials, such as viscose, cupro-ammonium cellulose, or carboxymethyl cellulose. Such materials may include various additives such as stabilizers, dyes, foaming agents, etc., if so desired.

For a greater understanding of this invention, reference is made to the following detailed description and drawing in which FIG. 1 is a horizontal section through a portion of one embodiment of the apparatus of the present invention;

FIG. 2 is a vertical section taken transversely through a portion of the apparatus shown in FIG. 1;

FIGS. 3, 4 and 5 are diagrammatic views similar to FIG. 1 illustrating elements of the apparatus in different positions which are assumed during the operation thereof;

FIG. 6 is a diagrammatic view illustrating the net-like structure which is produced by the apparatus shown in FIGS. 1–5;

FIG. 7 is a diagrammatic view of elements of another embodiment of the apparatus of the present invention;

Figure 10:
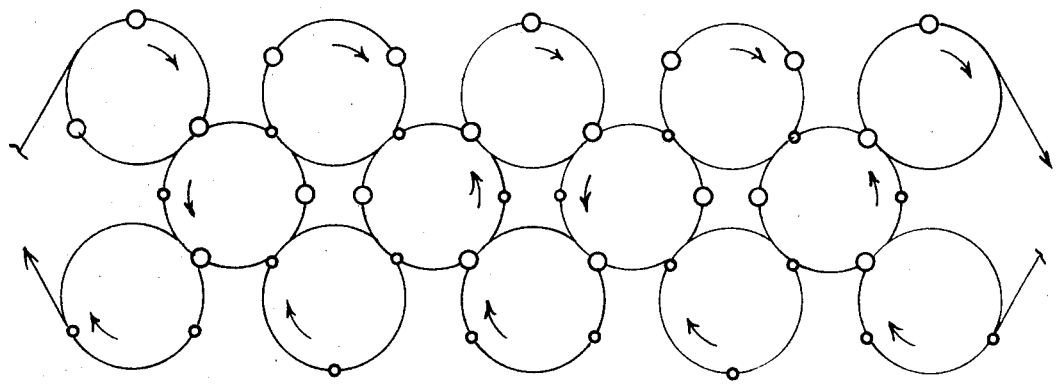
FIG. 10 is a diagrammatic view similar to FIG. 7 illustrating in more detail the cooperation between the different elements of the apparatus.

With reference to the drawing, the apparatus shown in FIGS. 1–5 includes an elongated housing 21 having chambers 23 and 25 extending substantially the entire length thereof. The chamber 23 is closed at its ends and serves as a reservoir for a flowable strand-forming material which is delivered thereto, under pressure, through one or more conduits 27. The chamber 25 is open at least at one end to accommodate a drive means, as more fully described hereafter, and is separated from the chamber 23 by a partition 29 which is part of the housing itself.

The apparatus also includes a row or series of aligned spinnerets, of which only three are shown in detail on the drawing at 31, 33 and 35. Each of the spinnerets is preferably of conical configuration as shown in FIG. 2, and is seated within aligned openings 37 and 39 formed in the partition 29 and housing bottom wall 41. The exposed end walls 43 of the spinnerets are substantially flush with the outermost surface of the housing bottom wall 41 and, as shown in FIG. 1, are positioned to make tangental contact with each other.

The opposite or innermost ends of the spinnerets are each formed with an extension 45 which projects into the housing chamber 25. Bevel gears 47 are fixed to each of the extensions 45, and mesh with a similar bevel gear 49 fixed to a main drive shaft 51. Adjacent bevel gears 49 are faced in opposite directions; that is, engage with opposite sides of their respective bevel gear 47, so that alternate spinnerets are rotated in the same direction, which is opposite to that of spinnerets which are directly adjacent thereto, as the shaft 51 is turned.

A compression spring 53 is provided about each of the spinneret extensions 45, between its respective bevel gear 47 and the uppermost surface 55 of the partition 29. Such springs maintain the spinnerets in proper sealing engagement with the housing and permit some longitudinal movement of the spinnerets themselves, as for example, for easier cleaning.

Extending through each of the spinnerets is a like number of passages, each of which opens at one end along the periphery of the spinneret bottom wall 43 and serves as an extrusion opening for strand-forming material. At their opposite ends, the passages open into the housing chamber 23 at different elevations, with alternate passages opening into such chamber 23 at the same elevation. For the sake of clarity, each of the spinnerets is illustrated as having only four of such pasasges, with diametrically opposed passages 57 opening into the housing chamber 23 at the same level but which is higher than that of opposing passages 59. The orientation of the passages 57 and 59 is the same in alternate spinnerets and the end walls 43 of adjacent spinnerets, as to the extrusion openings formed by their respective passages 57 and 59, are mirror images of each other.

The spinneret passages illustrated, in addition to being alike in the number, are the same in size and spacing. The ends of such passages which open along the spinneret walls 43 must be of greatest width at the spinneret periphery to insure proper transfer of strand-forming material to and therefrom.

With the apparatus shown in FIGS. 1–5 of the drawing, and as more fully described hereafter, the extrusion of strand-forming material through diametrically opposed passages in the individual spinnerets occurs in an alternating sequence which changes with each one-half revolution of the respective spinnerets. This control over the flow of strand-forming material through the passages of the individual spinnerets is achieved by fixed shutters 61 and 63. As shown in FIG. 2, the shutters 61 and 63 engage with the portion of the spinneret which is located within the housing chamber 23, and are adapted to extend over the spinneret passages 57 and 59, respectively, during spinneret rotation.

In the diagrammatic illustrations of the apparatus shown in FIGS. 3–5, the shutters 61 and 63 have been indicated by cross-hatching to simplify the description. Here, as well as in FIG. 1, it will be noted that each shutter 61 and 63 extends substantially 180° about the periphery of a spinneret and that the shutters 61 and 63 for each spinneret are off-set or displaced 180° from each other. Further, while the orientation of the shutters 61 and 63 is the same for alternate of the series of spinnerets, the respective shutters 61 and 63 of adjacent spinnerets are off-set or displaced 180° from each other.

At the start of operation of the above-described apparatus, plastic or strand-forming material is delivered under pressure into the housing chamber 23 through the conduit 27 and the shaft 51 is turned to rotate all of the spinnerets simultaneously and at the same rate of speed in the directions as indicated by arrows in FIGS. 1 and 3–6. During rotation of the spinnerets, strand-forming material issues from the extrusion openings in a desired sequence, as hereafter described in detail, and for purposes of explanation the extrusion openings defined by the passages 57 and 59 have been identified by capital and lower case letters, respectively.

Starting with the spinnerets in positions as shown in FIG. 3, the passages 57 which terminate in extrusion openings A, C and E in the spinnerets 31, 33 and 35 are closed by their respective shutters 61. Likewise, the passages 59 which terminate in extrusion openings a, c and e in the spinnerets 31, 33 and 35 are closed by their respective shutters 63. However, the remaining extrusion openings; namely, B, b, D, d, F and f, are uncovered so that continuous shaped streams of strand-forming material issue therefrom.

With continued rotation of the spinnerets 31, 33 and 35 into positions as shown in FIG. 4, the innermost ends of the passages 57 move relative to the ends of their respective fixed shutters 61, whereby the passages 57 terminating in extrusion openings A, C, and E are progressively uncovered while the passages 57 terminating in openings B, D and F are simultaneously being progressively covered. In these positions, as shown in FIG. 4, the innermost or entrance ends of the passages 57 are each one-half covered by the respective shutters 61 and the extrusion openings of adjacent spinnerets, which are defined by such passages 57, are in aligned and communicating relationship. Thus, while strand-forming material flows into and through all of the passages 57, only a single stream of such material issues from each pair of aligned and communicating extrusion openings which are defined by the passages 57.

In FIG. 6 of the drawing, the single streams issuing from communicating openings B and C, and D and E are denoted as 65 and 67, respectively. Extrusion openings A and F would each be in communication with like openings in spinnerets which are adjacent and tangent thereto (not shown) and therefore cooperate in forming streams of strand-forming material which have been denoted as 69 and 71, respectively.

During the rotation of the spinnerets 31, 33 and 35 from positions as shown in FIG. 3 to those of FIG. 4, the passages 59 terminating in openings b, d and f continue to extrude a series of streams of strand-forming material, as indicated at 73, 75 and 77, respectively, while the passages 59 terminating in extrusion openings a, c and e remain closed by shutters 63, as heretofore described.

Movement of the spinnerets 31, 33 and 35 beyond positions shown in FIG. 4 and toward those shown in FIG. 5 is accompanied by a continued and progressive closing of the passages 57 which terminate in openings B, D and F and a continued and progressive opening of the passages 57 which terminate in openings A, C and E. Thus, during the movement of the spinnerets between positions shown in FIGS. 3 and 5, streams of strand-forming material which initially issued from openings of certain of the passages 57 are now extruded from passages 57 in adjacent spinnerets which were previously closed. For example, in FIG. 3 the streams 65 and 67 are extruded from the respective openings B and D of the spinnerets 31 and 33. During movement toward positions as shown in FIG. 5, the extrusion of the streams 65 and 67 is assumed by the respective openings C and E of the spinnerets 33 and 35, which are directly adjacent to the spinnerets from which such streams were originally extruded.

Of importance is that this transition in the extrusion of the series of streams of strand-forming material 65, 67, 69 and 71 from one spinneret to another is achieved without any interruption in the extrusion operation or in continuity of the individual streams. Insofar as all of the extrusion openings are located along the spinneret peripheries, the series of streams of strand-forming material extruded from such openings will all move along arcuate paths as the spinnerets themselves are rotated. As the extrusion of the individual streams from the respective spinnerets is terminated and concomitantly assumed by spinnerets adjacent thereto their arcuate paths are changed, as viewed in FIGS. 3–5, say from one which is concave to one which is convex, but all streams of such series continue in the same general direction along such paths.

More particularly, while being extruded from openings B and F, the streams of strand-forming material 65 and 71 are moved in the same general direction (to the right as viewed in FIG. 3) along arcuate paths which are concave. As the extrusion of these streams 65 and 71 is assumed by openings in the spinnerets adjacent thereto, such as the opening C for stream 65, they are continued to be carried in the same general direction (to the right as viewed in FIG. 5) but along arcuate paths which are convex. Similarly, the streams 67 and 69, initially moving in the same general direction (to the right as viewed in FIG. 3) along convex arcuate paths, continue to move in the same general direction along concave arcuate paths when their extrusion is assumed by openings A and E, as shown in FIG. 5.

In effect, each of the continuous individual streams 65, 67, 69 and 71 travels along an unbroken serpentine path as it alternately assumes convex and concave arcuate paths, with all of such streams moving in the same general direction; that is, to the right as viewed in FIGS. 3–5. As a result of this movement alternately along crests and valleys of serpentine paths concomitantly with their extrusion, the individual streams of the series of streams 65, 67, 69 and 71 each possess a wavy or sinuous configuration which, for the most part, is retained once such streams are set into strands. As more fully described hereafter, such strands impart to the finished net-like structure a desired bulk or puffed characteristic.

Continuing with the operation of the apparatus, from the positions shown in FIG. 5, the spinnerets 31, 33 and 35 are rotated until they are oriented as shown in FIG. 1. Here it will be noted that the passages 59 terminating in extrusion openings a, b, c, d, e and f, have moved relative to the ends of the fixed shutters 63 and are each partially uncovered and in communicating relationship. More particularly, in moving into the positions shown in FIG. 1, the passages 59, which terminate in extrusion openings b, d and f and from which are extruding the series of streams 73, 75 and 77, are progressively covered while the passages 59 terminating in openings a, c and e are progressively uncovered. Thus, in the positions shown in FIG. 1, the streams 73, 75 and 77 are each extruded from communicating openings of adjacent spinnerets.

Upon still further rotation of the spinnerets in the direction indicated, the extrusion of the streams 73, 75 and 77 is assumed by the passages 59 which were heretofore closed, for example with the streams 73, 75 and 77 now issuing completely from openings a, c and e. During this transition in the extrusion of the streams 73, 75 and 77 from one spinneret to another continuity of these streams is maintained and the extrusion of streams 65, 67, 69 and 71, as heretofore described, is uninterrupted. Likewise, the passageway 57 which terminate in openings B, D and F remain closed by the shutters 61.

These latter openings B, D and F, however, will move into communication with like openings in adjacent spinnerets as the spinnerets continue their rotation and will ultimately assume the extrusion of the streams 65, 67, 69 and 71 in a manner as heretofore described.

It will be noted that the streams 73, 75 and 77 also move along serpentine paths but in a direction generally opposite to that of the streams 65, 67, 69 and 71; that is, to the left as viewed in FIGS. 1 and 3–5. As with the series of streams 65, 67, 69 and 71, the series of streams 73, 75, and 77 are of wavy or sinuous configuration, which configuration is generally retained as such streams are set into strands. Of particular importance is that the series of streams issuing from the spinneret passages 57 and the series of streams extruded from the passages 59 are moved in generally opposite directions along intersecting serpentine paths. The streams of one series, however, pass through the locations of path intersection in alternating relationship with the streams of the other of such series so that the strands formed by such streams are interlaced or interwoven with each other.

Setting of the two series of extruded streams of strand-forming material may be effected before or after they have made contact with each other. Obviously, in the latter instance the strands of the resulting net-like structure or fabric will be bonded to each other at their points of crossing. In view of the wavy or sinuous configuration of the strands, however, the net-like structures produced will all have a bulky or puffed appearance.

Turning now to FIGS. 7–11, the embodiment of the apparatus there illustrated includes a plurality of like spinnerets 81, 83, 85 and 87 which are all disposed in a plane or row substantially parallel to a plane or row containing spinnerets 89, 91, 93, 95 and 97 and a like plane or row containing spinnerets 99, 101, 103, 105 and 107. For ease and simplicity only spinnerets in three of such planes have been illustrated in detail and it will be understood that the apparatus may include additional rows of such spinnerets in planes parallel to those shown.

The spinnerets shown in FIG. 7 are of conical configuration and may be contained within a single housing, similar to the housing 21 of the embodiment shown in FIGS. 1–6, or may be each disposed within a separate fixed housing. Typical of this latter arrangement is that illustrated in FIG. 8 for the spinneret 81 which is rotatably mounted within a fixed housing 109. The inside wall 111 of the housing 109 is shaped to conform with the conical configuration of the spinneret 81 and terminates with a feathered edge 113 which is substantially flush with the end wall 115 of the spinneret. Portions of the walls of the housings 109 are, of course, removed in the areas at which adjacent spinnerets make tangential contact with each other. Plastic or strand-forming material is delivered into each of the housings under pressure by suitable means, not shown. Rotation of each of the spinnerets is effected by a separate shaft 117 which is turned by any conventional means so as to move respective spinnerets in the directions as indicated by arrows in FIG. 7.

The spinnerets 81, 83, 85 and 87 are of similar construction, with each including a like number of passages which open along the periphery of the respective spinneret end wall 115 and serve as an extrusion opening for plastic or strand-forming material. At their opposite ends, these passages open within the housing 109, at different distances from the spinneret periphery.

The number of passages in each of these spinnerets can, of course, be varied providing all spinnerets have a like number. For the sake of simplicity and clarity, each of the spinnerets 81, 83, 85 and 87 is illustrated as having only six of such passages. In each of these spinneret passages 119 alternate with passages 121. The passages 119 and the passages 121 open within the housings 109 along circles which are substantially concentric with the spinneret periphery but which are of different diameter. The orientation of the passages 119 and 121 in the spinnerets 81, 83, 85 and 87 is the same in alternate spinnerets, and in the specific embodiment shown in FIG. 7, such passages 119 and 121, respectively, are off-set about 60° in adajcent of such spinnerets.

Figure 8:
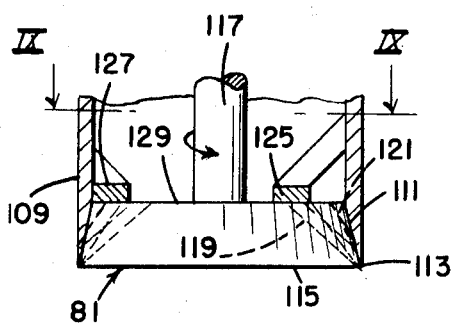
FIG. 8 is a fragmentary vertical section through one of the elements shown in FIG. 7.
Figure 9:
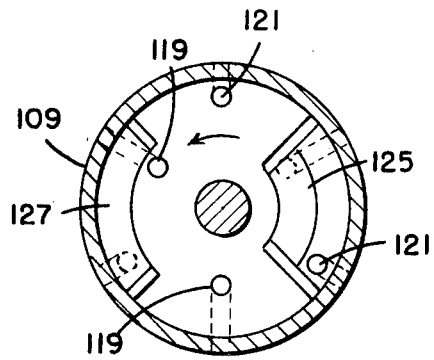
FIG. 9 is a horizontal section taken substantially along the line IX—IX of FIG. 8.

Control over the flow of strand-forming material through the passages 119 and 121 of the spinnerets 81, 83, 85 and 87 is achieved by fixed shutters 125 and 127, respectively. As shown in FIG. 8, the shutters 125 and 127 engage with the top walls 129 of these spinnerets in positions to extend over the passages 119 and 121, respectively. The shutters 125 and 127 each extend substantially along a 90° segment of the spinneret top wall and, as shown in FIG. 9, are disposed oppositely of each other.

The remaining spinnerets 89, 91, 93, 95, 97, 99, 101, 103, 105 and 107 are mounted within housing similar to the housing 109 and are in tangental contact with the spinnerets 81, 83, 85 and 87, as shown in FIG. 7. The spinnerets in these outermost planes or rows also include passages which extend from within their respective housings and open along the spinneret peripheries. These spinnerets, however, differ from those heretofore described by having only one-half the number of passages or, as illustrated, with such spinnerets having three passages which terminate along the periphery of the respective spinnerets in equally spaced extrusion openings.

In the spinnerets in each of the two outer planes, alternate spinnerets have the same orientation of passages while in adjacent spinnerets the passages are displaced substantially 60° from each other. It will be further noted that the spinnerets in the two outer planes are aligned with each other and that the passages in such aligned spinnerets, as for example the spinnerets 89 and 99, have the same orientation.

Fixed shutters 131, similar to the shutters 125 and 127, are provided within the housings of spinnerets in the two outermost planes for controlling the flow of plastic or strand-forming material through their respective passages. As shown in FIG. 7, each of these shutters 131 extends substantially along a 90° segment of the respective spinnerets, with the shutters 131 for the spinnerets in one of such outermost planes being disposed oppositely of those for the spinnerets in the other of such outermost planes.

At the start of operations of the apparatus shown in FIGS. 7–9, strand-forming material is delivered under pressure into the respective spinneret housings and all spinnerets are simultaneously rotated at substantially the same rate of speed. As will be noted from FIG. 7, the spinnerets in the two outermost planes of the three planes of spinnerets are all rotated in the same direction, which is opposite to that of the spinnerets in the middle plane of spinnerets. During rotation of the spinnerets, strand-forming material issues from the extrusion openings in a desired sequence, as hereafter described in detail. For purposes of explanation the extrusion openings defined by the passages 119 and 121 of the spinnerets 81, 83, 85, and 87 have been identified by capital and lower case letters, respectively. In addition, the extrusion openings of the spinnerets 89, 91, 93, 95 and 97 have been designated with primed capital letters, while the extrusion openings of the spinnerets 99, 101, 103, 105 and 107 have been identified with primed lower case letters.

As with the previously described embodiment of the invention, during the simultaneous rotation of the individual spinnerets in the directions as indicated by arrows in FIG. 7, extrusion of streams of strand-forming material occurs through all spinneret openings of passages which are not covered by the fixed shutters. At various stages during the rotation of these spinnerets, openings in the center row of spinnerets communicate with openings in the two outer rows of spinnerets and it is during such communication that extrusion is alternately terminated from and assumed by openings in the center row of spinnerets.

More particularly, in the positions of the spinnerets shown in FIG. 7, the extrusion openings thereof are either fully opened or fully closed. Upon rotation of the spinnerets from their positions shown in FIG. 7, the passages of openings J, $l$, Q and $s$ in alternate spinnerets of the center row of spinnerets move beyond the ends of their respective shutters 125 and 127 and communicate, respectively, with openings J', $m'$, Q' and $v'$ in the two outer rows of spinnerets, the feed passages of which are being covered by their shutters 131. The extrusion of strand-forming material is thus terminated from openings J', $m'$, Q' and $v'$ in spinnerets 89, 101, 93 and 105, respectively, and assumed by openings J, $l$, Q, and $s$ of spinnerets 81 and 85.

The passages 119 and 121 of openings M, $p$, V and $u$ of spinnerets 83 and 87 have, in FIG. 7, just been covered by shutters 125 and 127, so that extrusion of the strand-forming material from such opening has been terminated. In communication with such openings at such time of termination were openings S', $p'$, X', and $u'$ in the outermost rows of spinnerets which then assumed extrusion of the strand-forming material.

For purposes of discussion, this may be called the first stage of spinneret rotation and is diagrammatically illustrated in FIG. 10 which shows only the openings from which extrusion of strand-forming material is taking place. For purposes of clarity, spinneret openings denoted by capital letters in FIG. 7 are designated by circles of larger diameter in FIG. 10.

At a second stage of spinneret movement openings K, $j$, R and $q$ in spinnerets 81 and 85 of the center row of spinnerets communicate, respectively, with openings P', $j'$, U' and $q'$ in the outermost rows of spinnerets. During this period of communication, extrusion of strand-forming material is terminated from openings K, $j$, R and $q$ of spinnerets 81 and 85 as their passages 119 and 121 are covered by shutters 125 and 127. Concomitantly, the feed passages of openings P', $j'$, U' and $q'$ in the outer rows of spinnerets move beyond the ends of their shutters 131 so that such openings assume the extrusion of strand-forming material.

Simultaneously with the termination of extrusion from openings in spinnerets 81 and 85 during this second stage, the spinnerets of this center row which alternate therewith; namely, spinnerets 83 and 87, assume the extrusion of streams which heretofore were extruded from openings in the outer rows of spinnerets. More particularly, during this second stage the feed passages 119 and 121 of openings M, p, V and u in the spinnerets 83 and 87 move beyond the ends of their shutters 125 and 127 so that such openings communicate respectively, with openings M′, r′, V′, and y′ as their feed passages move relative to shutters 131. Thus, it will be noted that while extrusion of strand-forming material is being terminated from openings in alternate spinnerets 81 and 83, openings in the spinnerets 85 and 87 of this same center row are assuming the extrusion of streams of strand-forming material.

At a third stage in the spinneret rotation, openings K, j, R and q of alternate spinnerets 81 and 85 in the center row of spinnerets are in communication, respectively, with openings K′, n′, R′ and t′, the feed passages of which are being closed by shutters 131. At the same time spinnerets 83 and 87, which alternate with spinnerets 81 and 85 of the center row of spinnerets, are in such position that the feed passages 119 and 121 of their openings N, m, T and v are being closed by the shutters 125 and 127. At these stages, however, the openings N, m, T and v are in communication, respectively, with openings Q′, m′, Y′ and v′ in the outer rows of spinnerets. Thus, as openings K, j, R and q in spinnerets 81 and 83 of the center row are assuming the extrusion of strand-forming material, extrusion is being terminated from openings N, m, T and v in spinnerets 83 and 87 of this same center row of spinnerets.

Upon reaching a fourth stage, the spinnerets have been rotated 180° from their positions shown in FIG. 10 whereupon the extrusion of streams of strand-forming material is terminating from openings L, k, S and r in spinnerets 81 and 85 and is being assumed by openings M′, k′, V′ and r′, respectively, in the spinnerets of the outer rows. Simultaneously, openings N, m, T and v of spinnerets 83 and 87 are assuming the extrusion of streams of strand-forming material heretofore issuing from openings N′, s′, T′ and w′, respectively, in the spinnerets of the outer rows.

During a fifth stage of spinneret rotation, L, k, S and r of spinnerets 81 and 85 are assuming the extrusion of streams of strand-forming material from openings L′, p′, S′ and u′ in the outer rows of spinnerets. Spinnerets 83 and 87, which alternate with the spinnerets 81 and 85, are at the same time yielding the extrusion of streams of strand-forming material from openings P, n, U and t to openings R′, n′, W′ and t′ in the outer rows of spinnerets, respectively.

A sixth stage of spinneret rotation is attained as the spinnerets assume positions 300° from those shown in FIG. 10. In these positions, openings J, l, Q and s in spinnerets 81 and 85, which first assumed the extrusion of streams of strand-forming material during the first stage, yield such extrusion to openings N′, l′, T′ and s′ in the outer rows of spinnerets. Concomitantly, openings P, n, U and t in spinnerets 83 and 87 are assuming the extrusion of streams, the extrusion of which is terminating from openings P′, q′, U′ and x′ in the spinnerets of outer rows.

Continued rotation of the spinnerets from their sixth stage returns the same into positions as shown in FIG. 7 and then as shown in FIG. 10 whereupon the cycle of stages heretofore described is repeated.

As with the first-described embodiment of the invention, the termination in the extrusion of strand-forming material in one of each pair of communicating spinnerets and the simultaneous assumption of extrusion by the other of such openings of each pair insure continuity in the stream issuing therefrom. It will be noted from the above description that the extrusion of streams of strand-forming material issuing from openings in the outer row or spinnerets 89, 91, 93, 95 and 97 is yielded to openings in alternate spinnerets, such as 81 and 85, in the center row, and is then again assumed by openings in the same row of outer spinnerets as mentioned above. In other words, the extrusion of a stream issuing, for example from opening J′ in spinneret 89 assumed by opening J in spinneret 81 and is continued as the spinneret 81 moves through an arc of 300° and is then undertaken by opening N′ in the spinneret 91. Such streams thus travel to the right, as viewed in FIGS. 7 and 10, concomitantly with their extrusion and, when set, would appear as strands 133, 135, 137, 139 and 141 shown in FIG. 11.

On the other hand, the extrusion of streams of strand-forming material issuing from openings in the outer row of spinnerets 99, 101, 103, 105 and 107 is yielded to openings in alternate spinnerets, such as 83 and 87, of the center row and then again assumed by openings in spinnerets in the same outer rows mentioned above. Thus, a stream of strand-forming material issuing, for example from opening v′ in the spinneret 105, is assumed by the opening s in the spinneret 85 and continued as such spinneret rotates through an arc of 300° and is then yielded to the opening s′ in the spinneret 103. Such streams would therefore travel to the left, as viewed in FIGS. 7 and 10, concomitantly with their extrusion and, when set, would appear as strands 143, 145, 147, 149 and 151 shown in FIG. 11.

It will be further noted from the above-detailed description of the operation of the spinnerets that alternate spinnerets in the center row of spinnerets 81, 83, 85 and 87 assume and yield extrusion of strand-forming material in alternate relationship with the spinnerets of this same row which are adjacent thereto. Thus, as the spinnerets 81 and 85 are assuming extrusion of strand-forming material, extrusion is being terminated from spinnerets 83 and 87. As a result, the streams issuing therefrom cross each other at some location below their points of extrusion and thereby provide for the interlaced relationship of the resulting strands.

Figure 11:
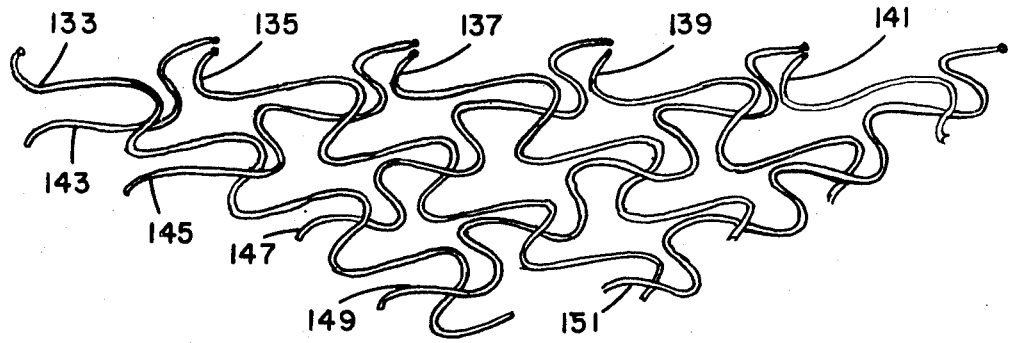
FIG. 11 is a diagrammatic view of the net-like structure as produced by the apparatus shown in FIGS. 7–10.

The movement of the streams of strand-forming material along serpentine paths during their extrusion; that is, through an arc of 300° with each spinneret which assumes its extrusion, provides each of the resulting strands with a sinuous configuration, as shown in FIG. 11, and gives the net-like structure formed from such strand a desired bulkiness.

Incorporation of additional rows of spinnerets into the apparatus shown in FIG. 7 will result in strands of more complex curvature. For example, a stream of strand-forming material issuing from the opening J of the spinneret 81, after being carried through an arc of 300° and assumed by the opening N′ of the spinneret 91, may be then yielded to an opening in a spinneret 153, which is part of still another row of spinnerets. This latter spinneret 153 may then yield the extrusion of the stream to an opening in the spinneret 93 which will carry the same toward the spinneret 85 which will assume the extrusion thereof. Thus, the extruded stream would extend along a serpentine path having a smaller frequency of crests and valleys. The strand which results from such stream would therefore have valleys and crests about twice as large as the strands shown in FIG. 11 but with each of such valleys and crests having additional bends which are formed during the extrusion of the streams from openings in the spinnerets 151. There is no limit on the number of rows of spinnerets which may be employed and, of course, the greater of such rows of spinnerets employed, the greater is the thickness of the resulting net-like structure.

While the detailed description has been directed in making a net-like structure having a plain weave, the teachings of the invention are also applicable to the manufacture of net-like structures having other weave patterns. For example, a net-like structure having twill weave may be formed with the apparatus shown in FIGS. 1–5 by having the spinnerets 31 and 35 assume the extrusion of two consecutive streams of strand-forming material from the spinnerets adjacent thereto, alternately with the transfer of a single stream to such adjacent spinnerets.

It is to be understood that changes and variations may be made without departing from the spirit and scope of the invention as defined in the appended claims.

I claim:

1. Apparatus for making a net-like structure having crossing strands including means for extruding a series of streams of plastic material at spaced intervals along each of two intersecting serpentine paths, means for moving the streams of each series along their respective serpentine paths with the streams of one series moving in a direction generally opposite to the other series thereof, and means for setting the extruded streams of plastic material.

2. Apparatus as defined in claim 1 wherein said extruding means includes a plurality of spinnerets, each of which is in tangential contact with at least two other of such spinnerets, said spinnerets each having extrusion openings formed along their peripheries.

3. Apparatus as defined in claim 2 wherein the means for moving the extruded streams along their respective serpentine paths includes drive means for rotating each of said spinnerets in a direction opposite to the two spinnerets in contact therewith, said extrusion openings of contacting spinnerets are oriented to provide for periodic communication therebetween at their locations of tangential contact, and including control means for alternately initiating and terminating the flow of plastic material to at least certain of said extrusion openings, said flow control means being operative to initiate the flow of plastic material from certain of said extrusion openings while concomitantly terminating the flow of plastic material from other of such openings as they move into and beyond communication with each other, whereby the extrusion of a stream of plastic material from one spinneret is assumed by a contacting spinneret, and means for setting the extruded streams.

4. Apparatus as defined in claim 3 wherein said flow control means includes stationary shutters for closing off the flow to the extrusion openings of said spinnerets.

5. Apparatus as defined in claim 2 wherein said plurality of spinnerets are disposed in a single row with each spinneret in tangential contact with the spinnerets directly adjacent thereto.

6. Apparatus as defined in claim 2 wherein said plurality of spinnerets are disposed in a series of rows, with the spinnerets in alternate rows being aligned with each other and staggered relative to the spinnerets in the rows adjacent thereto.

References Cited

UNITED STATES PATENTS

| | | | |
|---|---|---|---|
| 3,012,275 | 12/1961 | Nalle. | |
| 3,019,147 | 1/1962 | Nalle | 154—46 |
| 3,127,298 | 3/1964 | Nalle | 156—441 |
| 3,242,023 | 3/1966 | Schultheiss | 156—167 |
| 3,247,039 | 4/1966 | Schultheiss | 156—167 |
| 3,252,181 | 5/1966 | Hureau | 264—167 X |
| 3,331,903 | 7/1967 | Mine | 264—103 |

FOREIGN PATENTS

| | | |
|---|---|---|
| 1,357,630 | 12/1964 | France. |
| 380,369 | 9/1964 | Switzerland. |

JULIUS FROME, Primary Examiner

J. H. WOO, Assistant Examiner

U.S. Cl. X.R.

264—103; 156—167; 18—12; 28—1; 139—1; 87—12